(12) United States Patent
Weng et al.

(10) Patent No.: US 12,360,635 B2
(45) Date of Patent: Jul. 15, 2025

(54) ELECTRONIC DEVICE

(71) Applicant: CARUX TECHNOLOGY PTE. LTD., Singapore (SG)

(72) Inventors: Tsan-Po Weng, Tainan (TW); Chih-Kai Wang, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/479,842

(22) Filed: Oct. 3, 2023

(65) Prior Publication Data

US 2024/0152235 A1  May 9, 2024

(30) Foreign Application Priority Data

Nov. 9, 2022 (CN) .......................... 202211399449.0

(51) Int. Cl.
*G06F 3/041* (2006.01)
*G09G 3/34* (2006.01)
*G09G 3/36* (2006.01)

(52) U.S. Cl.
CPC ....... *G06F 3/04184* (2019.05); *G09G 3/3426* (2013.01); *G09G 3/3607* (2013.01); *G09G 2360/16* (2013.01)

(58) Field of Classification Search
CPC .. G06F 3/04184; G06F 3/3426; G06F 3/2607; G06F 3/36; G06F 3/0412; G06F 3/042; G09G 2360/16
See application file for complete search history.

(56) References Cited

U.S. PATENT DOCUMENTS

| 2013/0342478 A1* | 12/2013 | Bae ........................ G06F 3/0443 345/173 |
| 2018/0059855 A1* | 3/2018 | Gwon .................. H10K 59/131 |
| 2021/0064170 A1* | 3/2021 | Hwang .................... G06F 3/016 |

FOREIGN PATENT DOCUMENTS

| CN | 110647251 | 1/2020 |
| TW | 201011388 | 3/2010 |

* cited by examiner

*Primary Examiner* — David Tung
(74) *Attorney, Agent, or Firm* — JCIPRNET

(57) ABSTRACT

An electronic device is provided. The electronic device includes a touch module, a display module, and a control circuit. The display module includes multiple light emitting units. The control circuit is coupled to the touch module and the display module. During a display period, the control circuit provides a first display driving signal to the display module according to image data. During a touch period, the control circuit provides a touch driving signal to the touch module according to the image data. During the touch period, the control circuit provides a second display driving signal to the display module according to the image data. The touch period and the display period do not overlap. The first display driving signal is different from the second display driving signal.

13 Claims, 7 Drawing Sheets

ELECTRONIC DEVICE

CROSS-REFERENCE TO RELATED APPLICATION

This application claims the priority benefit of China application serial no. 202211399449.0, filed on Nov. 9, 2022. The entirety of the above-mentioned patent application is hereby incorporated by reference herein and made a part of this specification.

BACKGROUND

Technical Field

The disclosure relates to an electronic device, and particularly to an electronic device having a touch operation function.

Description of Related Art

In order to improve the convenience of the user in operating an electronic device, the conventional electronic device may have a touch operation function. The electronic device may include a display module and a touch module. However, changes in the signal level of a signal (for example, a data signal and/or a backlight data signal) used for the display module may interfere with the touch operation function, thereby reducing the accuracy of the touch operation. Therefore, how to optimize the timing distribution between the touch operation and the signal of the display module to improve the accuracy of the touch operation is one of the research focuses of persons skilled in the art.

SUMMARY

The disclosure provides an electronic device having a touch operation function.

According to an embodiment of the disclosure, an electronic device includes a touch module, a display module, and a control circuit. The display module includes multiple light emitting units. The control circuit is coupled to the touch module and the display module. The control circuit receives image data. During a display period, the control circuit provides a first display driving signal to the display module according to the image data. During a touch period, the control circuit provides a touch driving signal to the touch module according to the image data. During the touch period, the control circuit provides a second display driving signal to the display module according to the image data. The touch period and the display period do not overlap. The first display driving signal is different from the second display driving signal.

Based on the above, during the touch period, the control circuit provides the second display driving signal to the display module according to the image data. In this way, the control circuit optimizes the timing of a touch operation according to the second display driving signal, thereby improving the accuracy of the touch operation.

DESCRIPTION OF THE EMBODIMENTS

Figure 1:
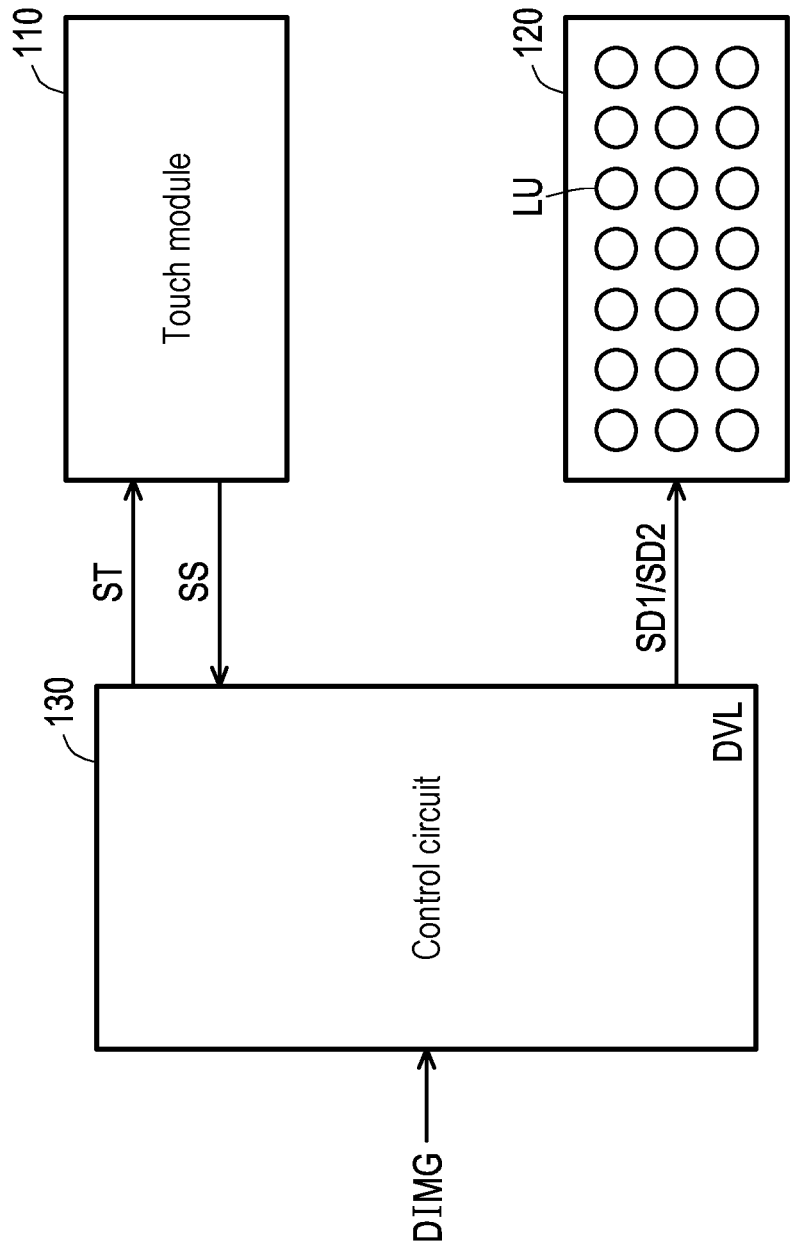
FIG. 1 is a schematic diagram of an electronic device according to a first embodiment of the disclosure.

The disclosure may be understood with reference to the following detailed description taken in conjunction with the drawings as described below. It should be noted that for the purpose of clarity and ease of understanding by the reader, various drawings of the disclosure depict a part of an electronic device, and certain elements in the various drawings may not be drawn to scale. Furthermore, the number and the size of each device shown in the drawings are illustrative only and are not intended to limit the scope of the disclosure.

Certain terms are used throughout the description and the following claims to refer to specific elements. As understood by persons skilled in the art, electronic apparatus manufacturers may refer to the elements by different names. The disclosure does not intend to distinguish between the elements that differ by name but not function. In the following description and in the claims, the terms "comprising", "including", and "having" are used in an open-ended manner and should thus be interpreted to mean "comprising but not limited to . . . ". Therefore, when the terms "comprising", "including", and/or "having" are used in the description of the disclosure, the same indicates the presence of a corresponding feature, region, step, operation, and/or element, but is not limited to the presence of one or more corresponding features, regions, steps, operations, and/or elements.

It should be understood that when an element is referred to as being "coupled to", "connected to", or "conducted to" another element, the element may be directly connected to the other element and may directly establish electrical connection or there may be an intermediate element between the elements for relaying electrical connection (indirect electrical connection). In contrast, when an element is referred to as being "directly coupled to", "directly conducted to", or "directly connected to" another element, there is no intermediate element present.

Although terms such as first, second, and third may be used to describe different constituent elements, such constituent elements are not limited by the terms. The terms are only used to distinguish a constituent element from other constituent elements in the specification. The claims may not use the same terms, but may use the terms first, second, third, etc. with respect to the required order of the elements. Therefore, in the following description, a first constituent element may be a second constituent element in the claims.

An electronic device of the disclosure may include a display apparatus, an antenna device, a sensing device, a light emitting device, a touch display, a curved display, or a free shape display, but not limited thereto. The electronic device may include a bendable or flexible electronic device. The electronic device may, for example, include liquid crystal (LC), a light emitting diode (LED), quantum dot (QD), fluorescence, phosphor, other suitable display media, or a combination of the above materials, but not limited thereto. The light emitting diode may, for example, include an organic light emitting diode (OLED), a mini LED, a micro LED, a quantum dot LED (including QLED or QDLED), other suitable materials, or a combination of the above, but not limited thereto. The display apparatus may, for example, include a splicing display apparatus, but not limited to. The antenna device may, for example, be a liquid crystal antenna, but not limited thereto. The antenna device may, for example, include an antenna splicing device, but not limited to. It should be noted that the electronic device may be any arrangement combination of the above, but not limited thereto. In addition, the appearance of the electronic device may be rectangular, circular, polygonal, a shape having curved edges, or other suitable shapes. The electronic device may have a peripheral system such as a driving system, a control system, and a light source system to support the display apparatus, the antenna device, or the splicing device, but the disclosure is not limited thereto. The sensing device may include a camera, an infrared sensor, a fingerprint sensor, etc., and the disclosure is not limited thereto. In some embodiments, the sensing device may also include a flash light, an infrared (IR) light source, other sensors, an electronic element, or a combination of the above, but not limited thereto.

In the disclosure, embodiments use a "pixel" or "pixel unit" as a unit for describing a specific region including at least one functional circuit for at least one specific function. The region of the "pixel" depends on the unit for providing the specific function, and adjacent pixels may share the same part or wire, but may also include their own specific parts. For example, the adjacent pixels may share the same scan line or the same data line, but the pixels may also have their own transistors or capacitors.

It should be noted that technical features in different embodiments described below may be replaced, recombined, or mixed with each other to constitute another embodiment without departing from the spirit of the disclosure.

Please refer to FIG. 1. FIG. 1 is a schematic diagram of an electronic device according to a first embodiment of the disclosure. An electronic device 100 includes a touch module 110, a display module 120, and a control circuit 130. In the embodiment, the touch module 110 and the display module 120 may be integrated into one of an on-cell touch display module, an in-cell touch display module, and a one glass solution (OGS) touch display module. The display module 120 includes multiple light emitting units LU. The light emitting units LU are, for example, arranged in multiple rows and columns. The control circuit 130 is coupled to the touch module 110 and the display module 120 and is configured to receive image data DIMG.

Figure 3:
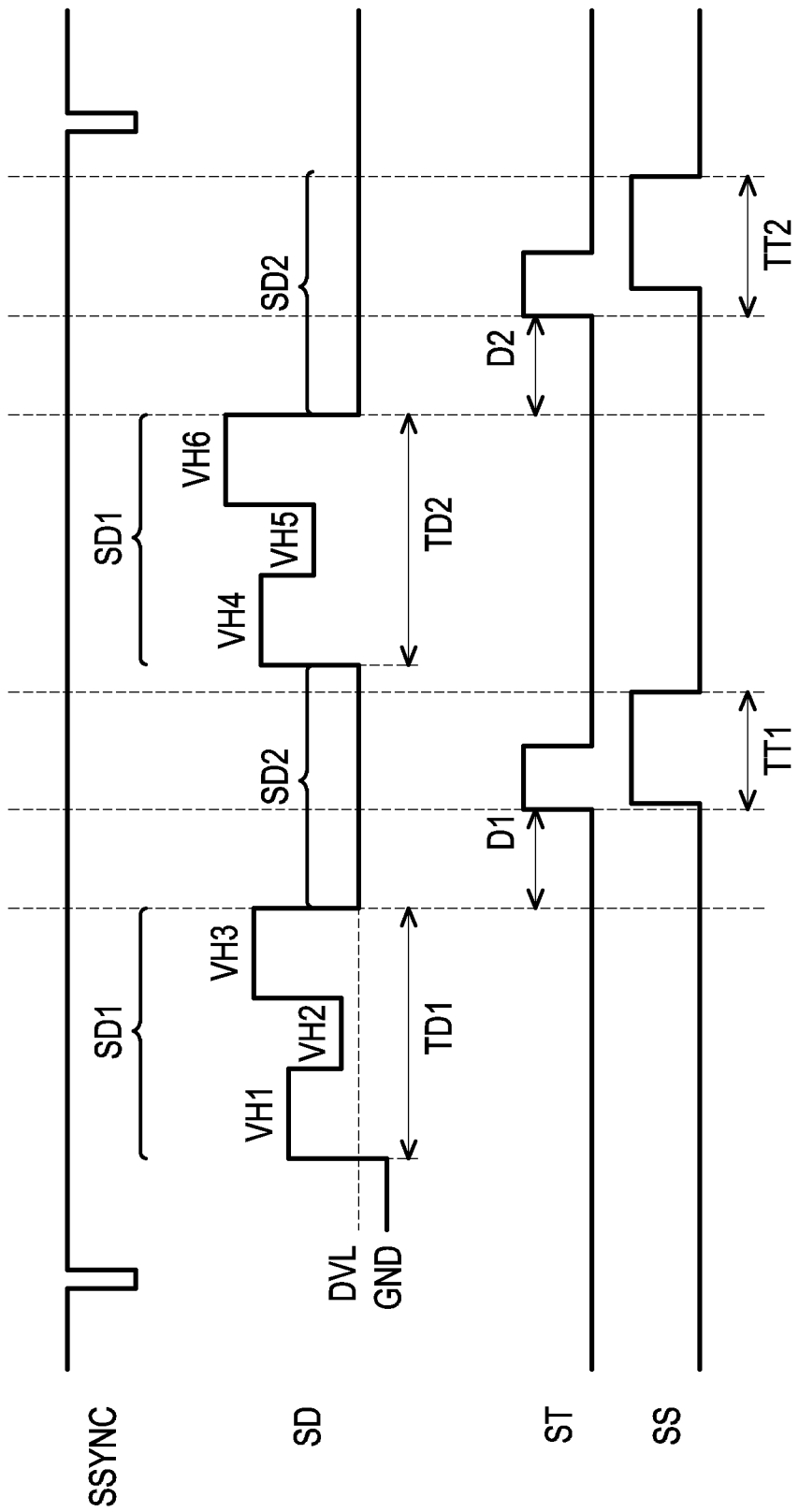
FIG. 3 is a signal timing diagram according to an embodiment of the disclosure.

Please refer to FIG. 1 and FIG. 3 at the same time. FIG. 3 is a signal timing diagram according to an embodiment of the disclosure. A display driving signal SD shown in FIG. 3 is exemplified by a signal received by a single light emitting unit LU. During a display period TD1, the control circuit 130 provides a first display driving signal SD1 to the display module 120 according to the image data DIMG. During a touch period TT1, the control circuit 130 provides a touch driving signal ST to the touch module 110 according to the image data DIMG. In addition, the control circuit 130 provides a second display driving signal SD2 to the display module 120 according to the image data DIMG during the touch period TT1. According to some embodiments, as shown in FIG. 3, the touch period TT1 may be between two display periods, such as between the display period TD1 and a display period TD2. In the embodiment, the touch period TT1 and the display period TD1 do not overlap. The first display driving signal SD1 is different from the second display driving signal SD2. In this way, the timing of a touch operation can be optimized, thereby improving the accuracy of the touch operation.

Please refer to FIG. 3. According to some embodiments, there is still a display driving signal during the touch period TT1, and when entering the next display period TD2, the light emitting unit LU does not need to be restarted and does not need a restart time. Therefore, power consumption of the light emitting unit LU can be reduced. According to some embodiments, a there is still a display driving signal during the touch period TT1 to keep the characteristic that the light emitting unit LU in the display module is not completely turned off. Thus, when the display driving signal is changed, such as when entering the touch period TT1 from the display period TD1 as shown in FIG. 3, the first display driving signal SD1 is changed to the second display driving signal SD2. For example, a voltage value VH3 is dropped to a default voltage value DVL instead of a ground GND. For example, the voltage value VH3 is not dropped to 0. Therefore, the magnitude of drop in the voltage value is smaller, which saves power. Similarly, when entering the display period TD2 from the touch period TT1, the second display driving signal SD2 is changed to another first display driving signal SD1. For example, the default voltage value DVL is raised to a voltage value VH4, instead of being raised to the voltage value VH4 from the ground GND. Therefore, the magnitude of increase in the voltage value is smaller, which saves power. According to some embodiments, as shown in FIG. 3, the voltage value of the first display driving signal SD1 may be greater than the voltage value of the second display driving signal SD2. For example, among voltage values VH1, VH2, and VH3 of the first display driving signal SD1, at least one of the voltage values of the first display driving signal SD1 is greater than the voltage value DVL of the second display driving signal SD2.

According to some embodiments, for convenience of description, FIG. 3 only shows the two display periods TD1 and TD2 and two touch periods TT1 and TT2. The touch period TT1 is between the two display periods TD1 and TD2, and the touch period TT2 is between the display period TD2 and another display period (not shown). According to some embodiments, one frame time may include multiple display periods and multiple touch periods, and the display periods and the touch periods may alternate.

Figure 4:
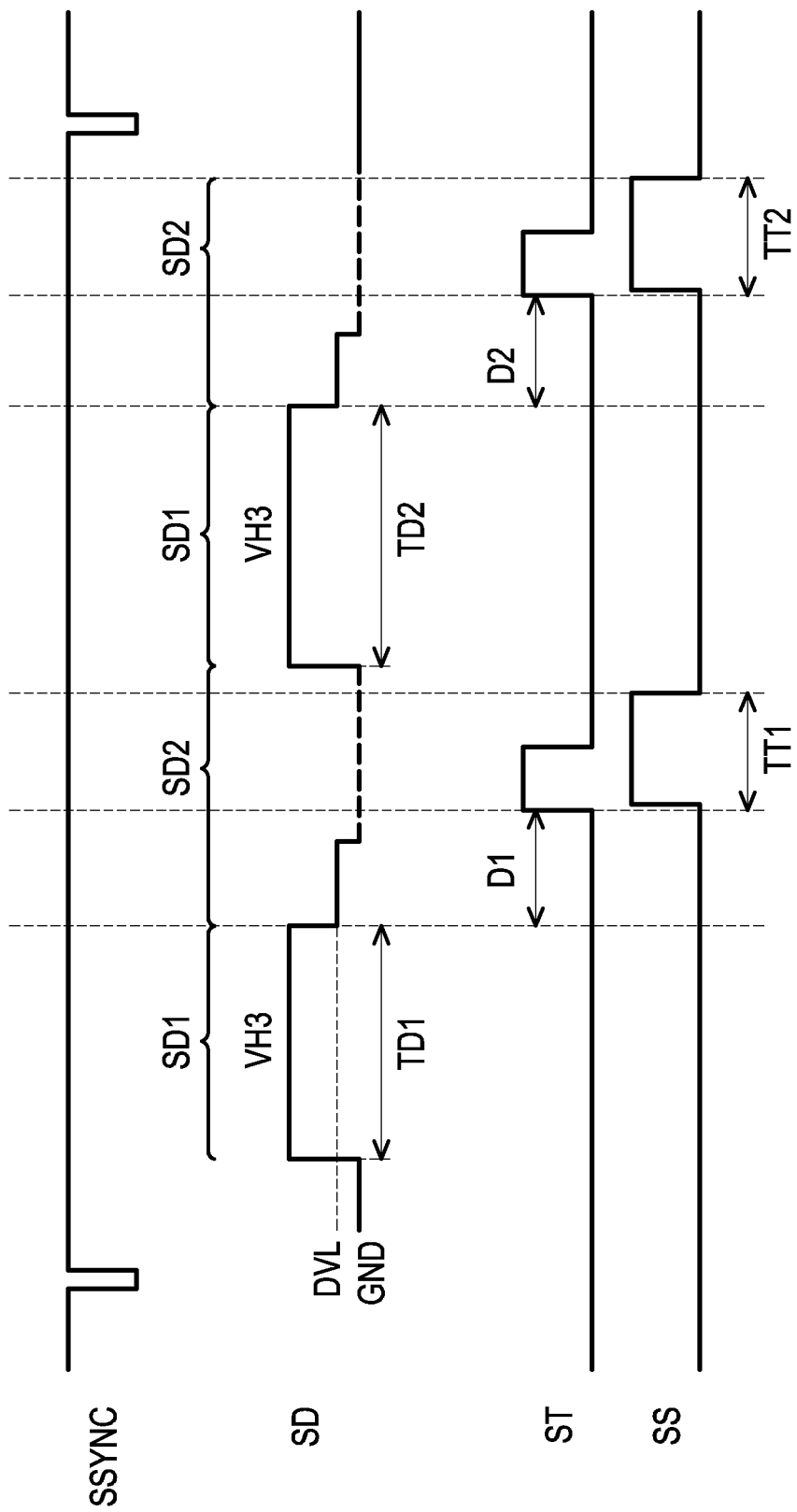
FIG. 4 is a signal timing diagram according to FIG. 2.

According to some embodiments, as shown in FIG. 3, the two first display driving signals SD1 are, for example, different, but not intended to limit the disclosure. However, according to other embodiments, the two display driving signals SD1 may be the same, which is not repeated here. In one frame time, display driving signals in different display periods may be the same or different, and touch driving signals in different touch periods may be the same or different, which is not limited by the disclosure. According to some embodiments, as shown in FIG. 3, during the same display period (for example, TD1), the first display driving signal SD1 may have different voltage values VH1, VH2, and VH3. However, according to other embodiments, as shown in FIG. 4, during the same display period (for example, TD1), the first display driving signal SD1 may have the same voltage value, such as the voltage value VH3.

According to some embodiments, as shown in FIG. 3, the voltage value of the second display driving signal SD2 may include the default voltage value DVL. For example, the voltage value of the second display driving signal SD2 is the default voltage value DVL. According to some embodiments, the default voltage value DVL may be a voltage value corresponding to the lowest brightness value of the light emitting units LU. According to some embodiments, the default voltage value DVL may be a voltage value corresponding to the lowest grayscale value of the light emitting units LU. The light emitting unit is not in a deactivated or disabled state during the touch period, but provides the lowest brightness value or the lowest grayscale value. Therefore, when switching from the touch period TT1 to the display period TD2, the light emitting units LU does not need to be restarted and does not need the restart time. In this way, the power consumption of the light emitting unit LU can be reduced.

For example, the control circuit 130 judges the generated display driving signal. When the current display driving signal to be output is the second display driving signal SD2, the electronic device 100 enters the touch period. During the touch period TT1, the control circuit 130 provides the touch driving signal ST to the touch module 110, and receives a touch sensing signal SS from the touch module 110, thereby performing a touch sensing operation of the electronic device 100.

It should be noted that the default voltage value DVL is the voltage value corresponding to the lowest brightness value or the lowest grayscale value of the light emitting units LU. Therefore, the light emitting unit LU is not in the deactivated or disabled state during the touch period, but provides the lowest brightness value or the lowest grayscale value. Therefore, when entering the display period, the light emitting unit LU does not need to be restarted and does not need the restart time. In this way, the power consumption of the light emitting unit LU can be reduced.

In the embodiment, the display module 120 may at least include a liquid crystal display module, an organic light emitting diode (OLED) display module, an inorganic light emitting diode (LED) display module, or a QD display module well known to persons skilled in the art.

In the embodiment, the touch module 110 may be a self capacitance or mutual capacitance touch module.

Figure 2:
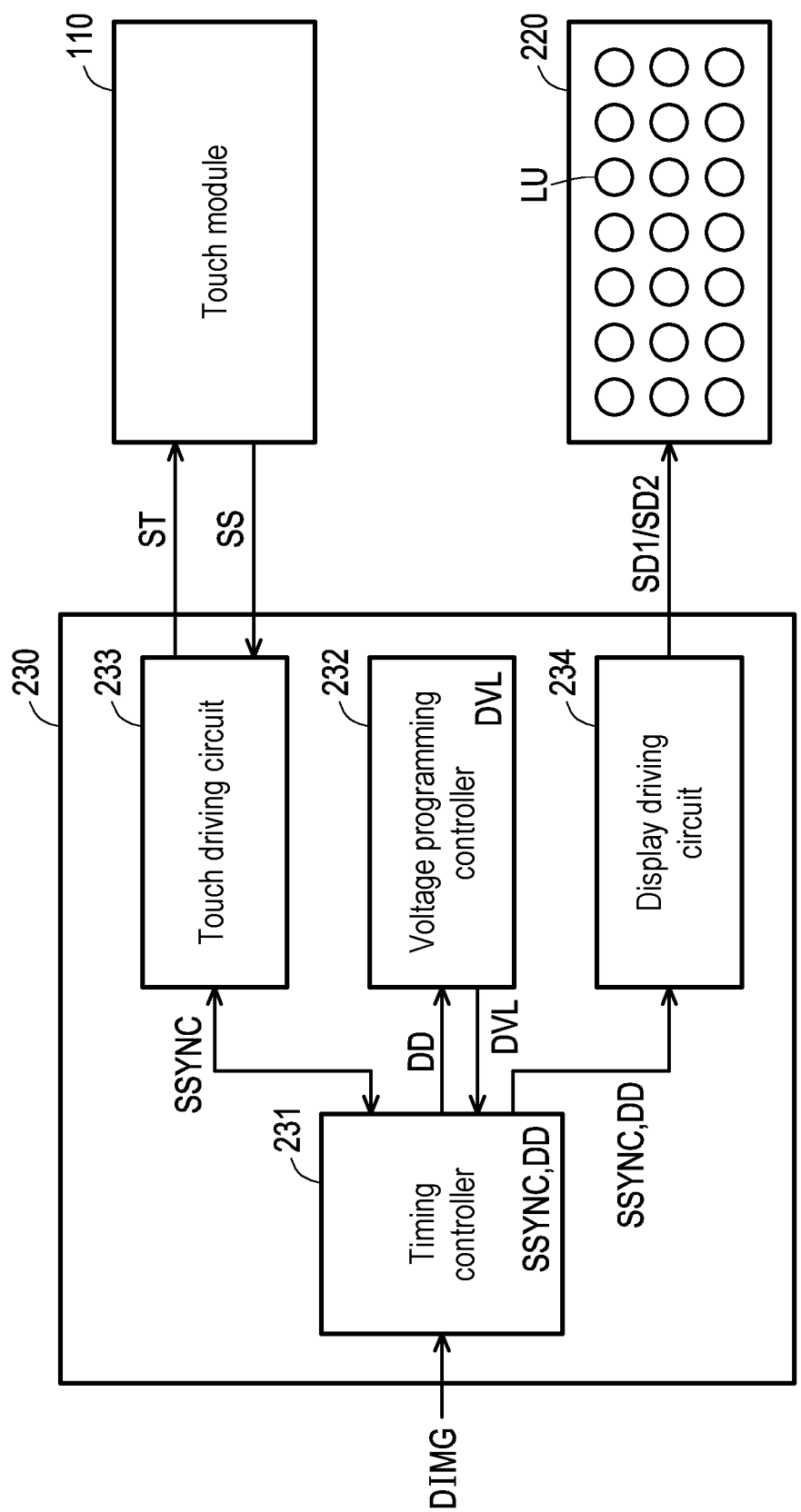
FIG. 2 is a schematic diagram of an electronic device according to a second embodiment of the disclosure.

Please refer to FIG. 2. FIG. 2 is a schematic diagram of an electronic device according to a second embodiment of the disclosure. In the embodiment, an electronic device 200 includes the touch module 110, a display module 220, and a control circuit 230. The display module 220 may include a display panel (not shown). The display panel may include multiple light emitting units LU. According to some embodiments, the display panel may be an active light emitting display panel, such as a light emitting diode display panel. The light emitting unit LU may serve as a pixel unit. According to some embodiments, the default voltage value DVL of the second display driving signal SD2 may provide the voltage value required for the lowest grayscale value of the light emitting units LU. In addition, the default voltage value DVL may be greater than a reference low voltage value (for example, ground or 0 volts).

In the embodiment, the control circuit 230 includes a timing controller 231, a voltage programming controller 232, a touch driving circuit 233, and a display driving circuit 234. The timing controller 231 may generate a digital data signal DD according to the image data DIMG and may provide a synchronization signal S SYNC. The voltage programming controller 23 may determine the default voltage value DVL according to the digital data signal DD. For example, the voltage programming controller 232 determines the default voltage value DVL according to the minimum digital value of the digital data signal DD and a gamma curve.

In some embodiments, the voltage programming controller 232 may be disposed in one of the timing controller 231 and the display driving circuit 234.

The touch driving circuit 233 is coupled to the timing controller 231 and the touch module 110. The display driving circuit 234 is coupled to the timing controller 231 and the display module 110. The display driving circuit 234 is coupled to the timing controller 231 and the display module 110. The display driving circuit 234 generates one of the first display driving signal SD1 and the second display driving signal SD2 according to the digital data signal DD, and drives the display module 110 according to one of the first display driving signal SD1 and the second display driving signal SD2.

In the embodiment, during the touch period, the timing controller 231 controls the touch driving circuit 233 to provide the touch driving signal ST to the touch module 110 and receive the touch sensing signal SS from the touch module 110. According to some embodiments, during the display period TD1, the touch driving circuit 233 may not provide the touch driving signal ST.

The timing controller 231 may determine the display period and the touch period. The timing controller 231 receives the default voltage value DVL provided by the voltage programming controller 232. The timing controller 231 adjusts the digital code value of the digital data signal DD corresponding to the second display driving signal SD2 according to the default voltage value DVL.

For example, the timing controller 231 increases the digital data signal DD corresponding to the second display driving signal SD2 during the touch period. The digital data signal DD during the touch period corresponds to the default voltage value DVL. Therefore, during the touch period, the voltage value of the second display driving signal SD2 is the default voltage value DVL. Therefore, the light emitting unit LU provides the lowest grayscale value. In addition, since the timing controller 231 can know the touch period, the timing controller 231 controls the touch driving circuit 233 to execute the touch sensing operation during the touch period.

In the embodiment, the display driving circuit 234 may be implemented by a circuit including at least a source driving circuit or a data driving circuit.

Please refer to FIG. 2 and FIG. 3 at the same time. In the embodiment, the timing controller 231 provides the synchronization signal SSYNC to the touch driving circuit 233 and the display driving circuit 234. After receiving the synchronization signal SSYNC, the display driving circuit 234 may sequentially provide the first display driving signals SD1 having the voltage values VH1, VH2, and VH3 to a single light emitting unit LU of the display module 220 during the display period TD1. The voltage values VH1, VH2, and VH3 of the first display driving signals SD1 are respectively greater than or equal to the default voltage value DVL. The different light emitting units LU of the display module 220 respectively emit light according to the first display driving signals SD1 having the voltage values VH1, VH2, and VH3. During the display period TD1, the touch driving circuit 233 does not provide the touch driving signal ST. According to some embodiments, the voltage value of the first display driving signal SD1 may be greater than the voltage value of the second display driving signal SD2.

During the touch period TT1, the second display driving signal SD2 has the default voltage value DVL. The light emitting unit LU provides the lowest grayscale value. The default voltage value DVL is greater than the reference low voltage value (for example, the ground GND). The touch driving circuit 233 provides the touch driving signal ST to the touch module 110 and receives the touch sensing signal SS from the touch module 110 during the touch period TT1. Further, when the second display driving signal SD2 is initially provided, the control circuit 230 provides the touch driving signal ST after a delay time length D1, and receives the touch sensing signal SS from the touch module 110. In other words, the display period TD1 and the touch period TT1 are separated by the delay time length D1. Based on the delay time length D1, a transition time point of the touch driving signal ST is different from a start time point of the second display driving signal SD2 being provided. Therefore, the interference caused by change s in the voltage value (such as dropping from the voltage value VH3 to the default voltage value DVL) of the display driving signal SD on the touch driving signal ST and the touch sensing signal SS can be reduced.

During the display period TD2, the display driving circuit 234, for example, sequentially provides the first display driving signals SD1 having voltage values VH4, VH5, and VH6. The voltage values VH4, VH5, and VH6 are respectively greater than or equal to the default voltage value DVL. The different light emitting units LU of the display module 220 respectively emit light according to the first display driving signals SD1 having the voltage values VH4, VH5, and VH6. During the display period TD2, the touch driving circuit 233 does not provide the touch driving signal ST.

During the touch period TT2, the second display driving signal SD2 has the default voltage value DVL. The light emitting unit LU provides the lowest grayscale value. When the second display driving signal SD2 is provided, the control circuit 230 provides the touch driving signal ST and receives the touch sensing signal SS from the touch module 110 after a delay time length D2. Therefore, the control circuit 230 provides the touch driving signal ST and receives the touch sensing signal SS from the touch module 110 during the touch period TT2. The display period TD2 and the touch period TT2 are separated by the delay time length D2.

In the embodiment, the delay time length D2 is equal to the delay time length D1. In some embodiments, the delay time length D2 is different from the delay time length D1.

In the embodiment, the display periods TD1 and TD2 are, for example, periods during which the light emitting units LU in at least one row or at least one column receive the second display driving signal SD2. In the embodiment, the touch periods TT1 and TT2 are, for example, periods after the light emitting units LU in at least one row or at least one column receive the second display driving signal SD2. The order of the display periods TD1 and TD2 and the touch periods TT1 and TT2 of the disclosure is not limited by the embodiment.

The embodiment is applicable to the display module 220 having various refresh rates. For example, the refresh rate of the display module 220 may be 60 Hz, 120 Hz, 144 Hz, 240 Hz, or 300 Hz.

In the embodiment, as shown in FIG. 3, one frame time may be defined between two synchronization signals SSYNC. The synchronization signal SSYNC may be a negative pulse. One frame time may include multiple display periods and multiple touch periods. For example, as shown in FIG. 3, for convenience of description, only the frame time including the display periods TD1 and TD2 and the touch periods TT1 and TT2 is shown, but the disclosure is not limited thereto. The frame time of the disclosure includes at least one display period and at least one touch period.

For ease of description, the touch driving signal ST of the embodiment is exemplified by a single square wave. However, the disclosure is not limited thereto. The touch driving signal ST of the disclosure may include at least one square wave or at least one sine wave.

Please refer to FIG. 2 and FIG. 4 at the same time. FIG. 4 is a signal timing diagram according to FIG. 2. In the embodiment, the display driving signal SD shown in FIG. 4 is exemplified by a signal received by a single light emitting unit LU of the display module 220. The display driving circuit 234 provides the first display driving signal SD1 having the voltage value VH3 during the display period TD1. At least one light emitting unit LU of the display module 220 may emit light according to the first display driving signal SD1 having the voltage value VH3. According to some embodiments, as shown in FIG. 4, at least one of the light emitting units in the embodiment provides the highest grayscale value according to the first display driving signal having the highest voltage value (also known as rated voltage value). For example, the highest voltage value may be the voltage value VH3. The highest voltage value VH3 is greater than the default voltage value DVL. According to some embodiments, the default voltage value DVL may be between 0.1 and 50%, such as between 0.1 and 20%, between 1 and 40%, between 1 and 30%, between 5 and 30%, between 5 and 20%, between 10% and 50%, and between 30% and 50%, of the highest voltage value VH3.

For example, the grayscale value ranges from "1" to "255". The at least one of the light emitting units LU may provide the highest grayscale value "255" according to the first display driving signal SD1 having the highest voltage value (for example, the voltage value VH3). In this case, the light emitting unit LU provides the grayscale value "1" to "50" according to the default voltage value DVL.

In addition, during the display period TD1, when the second display driving signal SD2 is initially provided, the control circuit 230 provides the touch driving signal ST and receives the touch sensing signal SS from the touch module 110 after the delay time length D1. Therefore, the control circuit 230 provides the touch driving signal ST and receives the touch sensing signal SS from the touch module 110 during the touch period TT1. The display period TD1 and the touch period TT1 are separated by the delay time length D1.

During the touch period TT1, there is a high impedance (Hi-z) between the display driving circuit 234 and the display module 220. The second display driving signal SD2 received by the display module 220 during the touch period TT1 is substantially floating, that is, a floating signal (illustrated by a dotted line). Furthermore, during the touch period TT1, based on the capacitive coupling effect inside the display module 220, the second display driving signal SD2 received by the display module 220 fluctuates along with the touch driving signal ST. The parasitic capacitance of the display module 220 is reduced. Therefore, the interference of the touch operation is reduced.

During the display period TD2, the display driving circuit 234 also provides the first display driving signal SD1 having the voltage value VH3. The at least one light emitting unit LU of the display module 220 respectively emits light according to the first display driving signal SD1 having the voltage value VH3. In addition, during the display period TD2, when the second display driving signal SD2 is initially provided, the control circuit 230 provides the touch driving signal ST and receives the touch sensing signal SS from the touch module 110 after the delay time length D2. Therefore, the control circuit 230 provides the touch driving signal ST and receives the touch sensing signal SS from the touch module 110 during the touch period TT2.

During the touch period TT2, there is a high impedance between the display driving circuit 234 and the display module 220. The second display driving signal SD2 received by the display module 220 during the touch period TT2 is also substantially floating.

Figure 5:
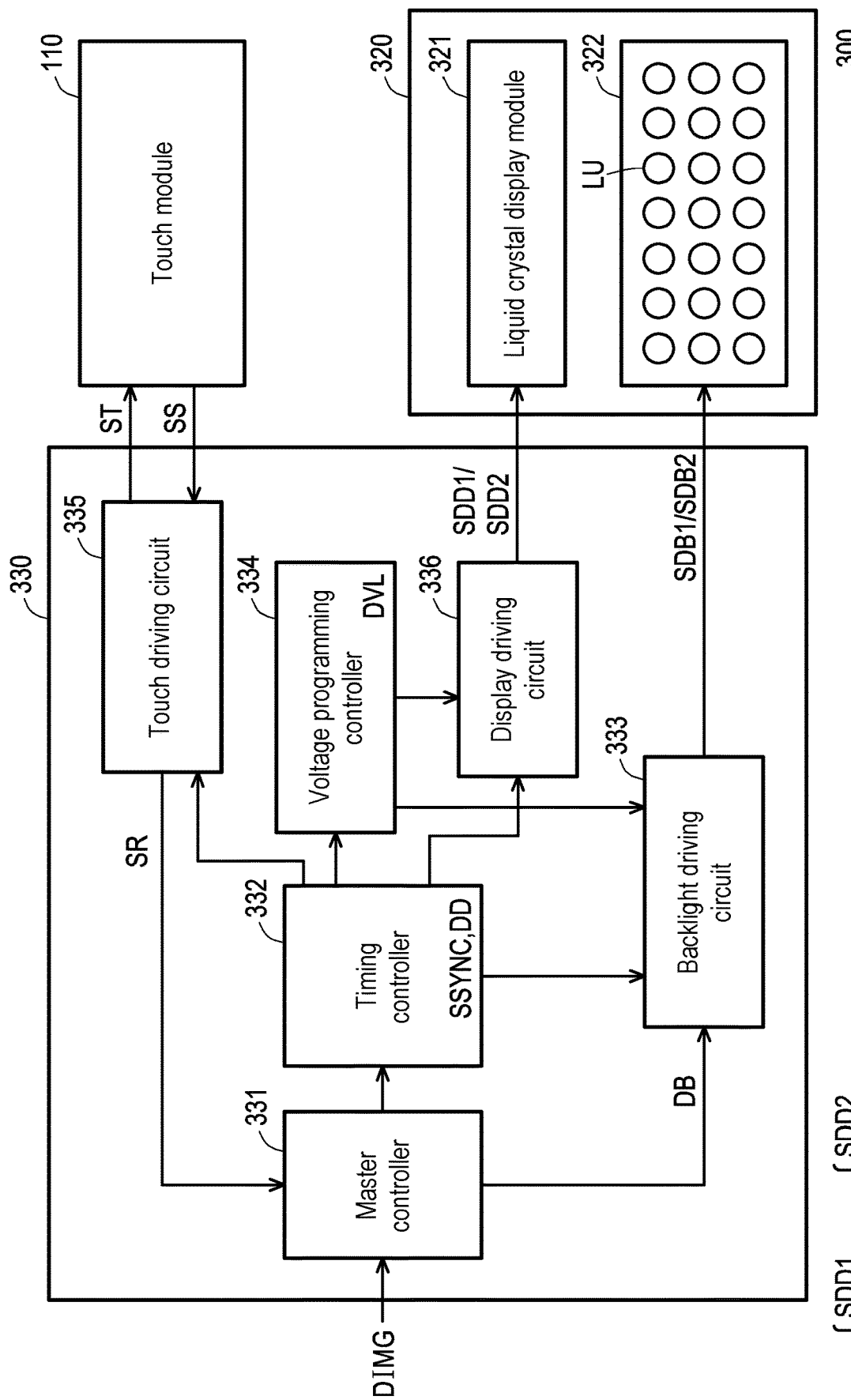
FIG. 5 is a schematic diagram of an electronic device according to a third embodiment of the disclosure.

Please refer to FIG. 5 at the same time. FIG. 5 is a schematic diagram of an electronic device according to a third embodiment of the disclosure. In the embodiment, an electronic device 300 includes the touch module 110, a display module 320, and a control circuit 330. The display module 320 includes a liquid crystal display module 321 and a backlight module 322. The backlight module 322 includes multiple light emitting units LU. The control circuit 330 is coupled to the touch module 310, the liquid crystal display module 321, and the backlight module 322. The control circuit 330 receives the image data DIMG. The first display driving signal SD1 includes a first liquid crystal driving signal SDD1 and a first backlight driving signal SDB1. The second display driving signal SD2 includes a second liquid crystal driving signal SDD2 and a second backlight driving signal SDB2.

Figure 6:
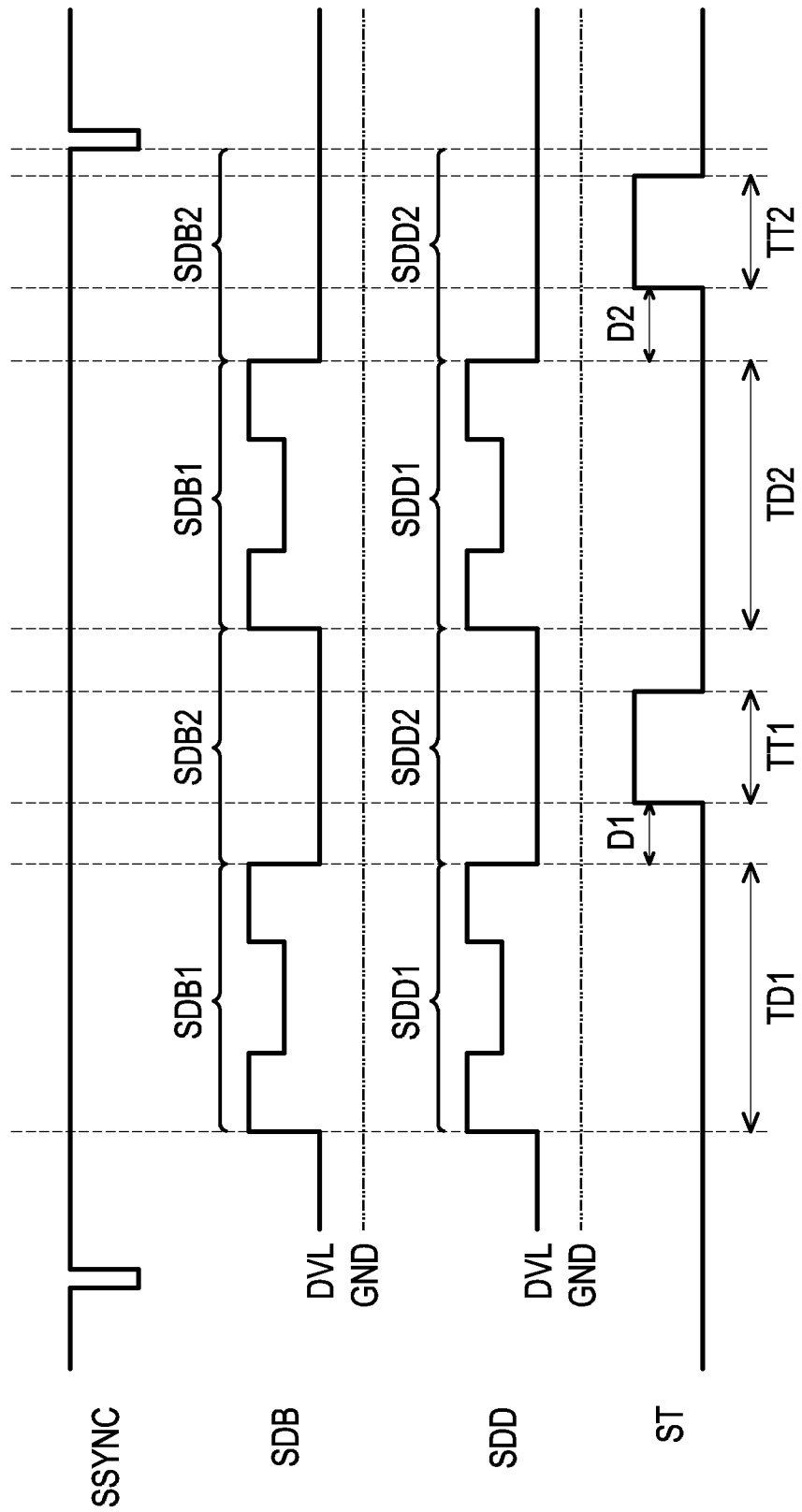
FIG. 6 is a first signal timing diagram according to FIG. 5.

Please refer to FIG. 5 and FIG. 6 at the same time. During the display period TD1, the control circuit 330 may provide the first liquid crystal driving signal SDD1 to the liquid crystal display module 321 according to the image data DIMG, and may provide the first backlight driving signal SDB1 to the backlight module 322. During the touch period TT1, the control circuit 330 may provide the touch driving signal ST to the touch module 110 according to the image data DIMG. In addition, during the touch period TT1, the control circuit 130 may provide the second liquid crystal driving signal SDD2 to the liquid crystal display module 321 according to the image data DIMG, and provide the second backlight driving signal SDB2 to the backlight module 322. The first liquid crystal driving signal SDD1 may be different from the second liquid crystal driving signal SDD2. The first backlight driving signal SDB1 may be different from the second backlight driving signal SDB2.

In the embodiment, the light emitting units LU are disposed in the backlight module 322. Therefore, the backlight module 322 can provide a local dimmable output light source according to the first backlight driving signal SDB1 and the second backlight driving signal SDB2. In the embodiment, the voltage value of the second backlight driving signal SDB2 may include the default voltage value DVL. The default voltage value DVL is the voltage value corresponding to the lowest brightness value of the light emitting units LU.

Taking the embodiment as an example, as shown in FIG. 5, the control circuit 330 includes a master controller 331, a timing controller 332, a backlight driving circuit 333, a voltage programming controller 334, a touch driving circuit 335, and a display driving circuit 336. The timing controller 332 may be configured to provide the synchronization signal SSYNC. The master controller 331 may control the timing controller 332 to generate the digital data signal DD, and control the backlight driving circuit 333 to generate one of the first backlight driving signal SDB1 and the second backlight driving signal SDB2. The master controller 331 receives the image data DIMG and controls the timing controller 332 according to the image data DIMG. The master controller 331 also generates backlight image data DB according to the image data DIMG. The backlight driving circuit 333 generates one of the first backlight driving signal SDB1 and the second backlight driving signal SDB2 according to the backlight image data DB.

The voltage programming controller 334 may be coupled to the timing controller 332. The voltage programming controller 334 may determine the default voltage value DVL according to the digital data signal DD. In the embodiment, the voltage programming controller 334 may receive the digital data signal DD generated by the timing controller 332, and determine the default voltage value DVL according to the digital data signal DD. After determining the default voltage value DVL, the voltage programming controller 334 provides the default voltage value DVL to at least one of the backlight driving circuit 333 and the display driving circuit 336. For example, the backlight driving circuit 333 can determine the voltage value corresponding to the lowest brightness value of the light emitting unit LU according to the default voltage value DVL. For another example, the display driving circuit 336 can also determine the voltage value corresponding to the lowest grayscale value of a pixel or a sub-pixel according to the default voltage value DVL.

In the embodiment, the backlight driving circuit 333 uses one of the first backlight driving signal SDB1 and the second backlight driving signal SDB2 to drive the backlight module 322. The touch driving circuit 335 is coupled to the timing controller 332 and the touch module 110. The touch driving circuit 335 drives the touch module 110. The display driving circuit 336 is coupled to the timing controller 332 and the liquid crystal display module 321. The display driving circuit 336 generates one of the first liquid crystal driving signal SDD1 and the second liquid crystal driving signal SDD2 according to the digital data signal DD, and drives the liquid crystal display module 321 according to one of the first liquid crystal driving signal SDD1 and the second liquid crystal driving signal SDD2.

In the embodiment, the touch driving circuit 335 also converts the touch sensing signal SS into a coordinate signal SR. The touch driving circuit 335 reports the coordinate signal SR to the master controller 331. Therefore, the master controller 331 can determine touch coordinates of the touch operation performed by the user on the touch module 110 based on the coordinate signal SR.

In the embodiment, the master controller 331 is, for example, a central processing unit (CPU), other programmable general purpose or specific purpose microprocessors, digital signal processors (DSP), programmable controllers, application specific integrated circuits (ASIC), programmable logic devices (PLD), other similar devices, or a combination of the devices, which can load and execute a computer program.

Please refer to FIG. 5 and FIG. 6 at the same time. FIG. 6 is a first signal timing diagram according to FIG. 5. In the embodiment, the liquid crystal driving signal SDD shown in FIG. 6 is exemplified by a signal received by a single pixel (not shown) of the liquid crystal display module 321. A backlight driving signal SDB shown in FIG. 6 is exemplified by a signal received by a single light emitting unit LU of the backlight module 322. The single pixel corresponds to the single light emitting unit LU. The timing controller 332 provides the synchronization signal SSYNC to at least one of the backlight driving circuit 333, the touch driving circuit 335, and the display driving circuit 336 to start the display period TD1. During the display period TD1, the display driving circuit 234, for example, sequentially provides the first liquid crystal driving signal SDD1 to the single pixel of the liquid crystal display module 321. In addition, during the display period TD1, the backlight driving circuit 333, for example, sequentially provides the first backlight driving signal SDB1 to the single light emitting unit LU of the backlight module 322. For example, the waveform of the first backlight driving signal SDB1 substantially follows the waveform of the display data signal SDD. During the display period TD1, the touch driving circuit 335 does not provide the touch driving signal ST.

During the touch period TT1, the voltage value of the second backlight driving signal SDB2 is the default voltage value DVL. The light emitting unit LU provides the lowest brightness value. The touch driving circuit 335 provides the touch driving signal ST to the touch module 110 and receives the touch sensing signal SS from the touch module 110 during the touch period TT1. Further, when the second backlight driving signal SDB2 is initially provided, the touch driving circuit 335 provides the touch driving signal ST and receives the touch sensing signal SS from the touch module 110 after the delay time length D1. Therefore, the touch driving circuit 335 can ensure to provide the touch driving signal ST and receive the touch sensing signal SS from the touch module 110 during the touch period TT1. In addition, the voltage value of the second liquid crystal driving signal SDD2 is also the default voltage value DVL.

During the display period TD2, the display driving circuit 336, for example, sequentially provides the first liquid crystal driving signal SDD1 to the single pixel of the liquid crystal display module 321. In addition, during the display period TD1, the backlight driving circuit 333, for example, sequentially provides the first backlight driving signal SDB1 to the single light emitting unit LU of the backlight module 322. During the display period TD2, the touch driving circuit 335 does not provide the touch driving signal ST.

During the touch period TT2, the second backlight driving signal SDB2 is provided. The light emitting unit LU provides the lowest brightness value. The touch driving circuit 335 provides the touch driving signal ST to the touch module 110 and receives the touch sensing signal SS from the touch module 110 during the touch period TT2.

In some embodiments, during the touch periods TT1 and TT2, the voltage value of the second liquid crystal driving signal SDD2 may be 0 volts. In some embodiments, during the touch periods TT1 and TT2, the display data signal SDD received by the liquid crystal display module 321 is floating. In some embodiments, during the touch period TT1, the control circuit provides the touch driving signal, and at least one of the liquid crystal driving signal received by the liquid crystal display module 321 and the second backlight driving signal SDB2 received by the backlight module 322 is floating. In some embodiments, during the touch period TT1, the second backlight driving signal SDB2 received by the backlight module is floating.

Figure 7:
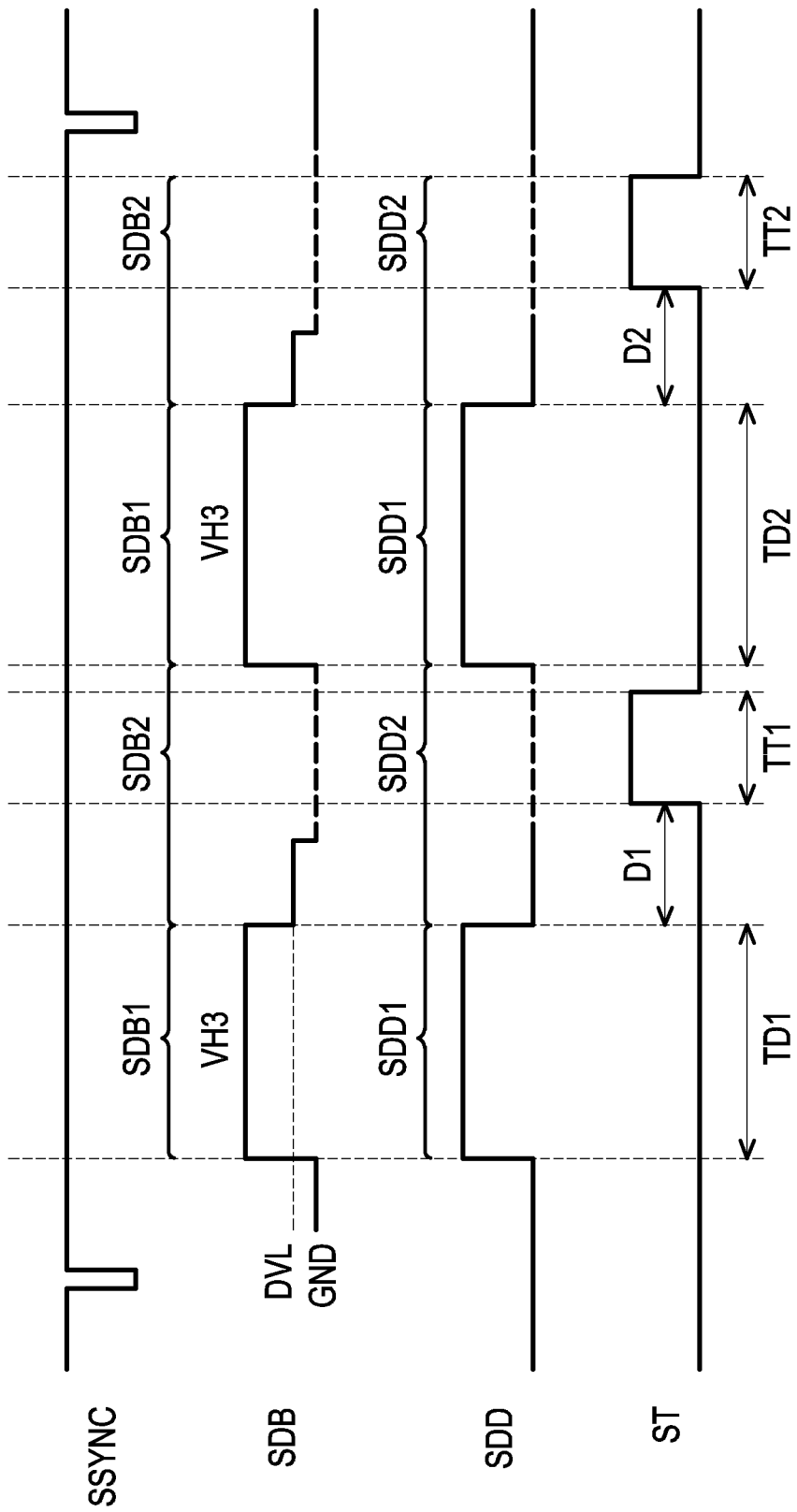
FIG. 7 is a second signal timing diagram according to FIG. 5.

Please refer to FIG. 5 and FIG. 7 at the same time. FIG. 7 is a second signal timing diagram according to FIG. 5. In the embodiment, the display driving signal SDD shown in FIG. 7 is exemplified by a signal received by a single pixel (not shown) of the liquid crystal display module 321. The backlight driving signal SDB shown in FIG. 7 is exemplified by a signal received by a single light emitting unit LU of the backlight module 322. The single pixel corresponds to the single light emitting unit LU. The display driving circuit 336 provides the first backlight driving signal SDB1 having the voltage value VH3 during the display period TD1. At least one light emitting unit LU of the backlight module 322 respectively emits light according to the first backlight driving signal SDB1 having the voltage value VH3.

According to some embodiments, as shown in FIG. 7, at least one of the light emitting units may provide the highest brightness according to the first backlight driving signal having the highest voltage value. For example, the highest voltage value may be VH3. The highest voltage value VH3 is greater than the default voltage value DVL. According to some embodiments, the default voltage value DVL may be between 0.1 and 50%, such as between 0.1 and 20%, between 1 and 40%, between 1 and 30%, between 5 and 30%, between 5 and 20%, between 10% and 50%, and between 30% and 50%, of the highest voltage value VH3.

According to some embodiments, as shown in FIG. 7, during the touch period TT1, the second backlight driving signal SDB2 may have the default voltage value DVL and may provide a default brightness for the light emitting unit. The default voltage value DVL is less than the highest voltage value VH3, and the default brightness is lower than the highest brightness. The default brightness may be between 0.1% and 50%, such as between 1% and 30%, between 1% and 20%, between 1% and 10%, and between 0.1% and 20%, of the highest brightness. According to some embodiments, during the display period TD1, the touch driving circuit 335 may not provide the touch driving signal ST.

During the touch period TT1, the second liquid crystal driving signal SDD2 is provided. However, there is a high impedance between the display driving circuit 336 and the liquid crystal display module 321. Therefore, the second liquid crystal driving signal SDD2 received by the liquid crystal display module 321 is substantially floating. In addition, the second backlight driving signal SDB2 is provided. However, there is a high impedance between the backlight driving circuit 333 and the backlight module 322. The backlight data signal SDB received by the backlight module 322 is also substantially floating.

Similar to the display period TD1, during the display period TD2, the display driving circuit 336 provides the backlight data signal SDB having the voltage value VH3 during the display period TD2. At least one light emitting unit LU of the backlight module 322 respectively emits light according to the first backlight driving signal SDB1 having the voltage value VH3. During the display period TD2, the touch driving circuit 335 does not provide the touch driving signal ST.

Similar to the touch period TT1, during the touch period TT2, there is a high impedance between the display driving circuit 336 and the liquid crystal display module 321. Therefore, the second liquid crystal driving signal SDD2 received by the liquid crystal display module 321 is substantially floating. In addition, there is a high impedance between the backlight driving circuit 333 and the backlight module 322. The backlight data signal SDB received by the backlight module 322 is also substantially floating.

In summary, according to some embodiments, during the display period, the control circuit provides the first display driving signal to the display module according to the image data, during the touch period, the control circuit provides the second display driving signal to the display module according to the image data, and the first display driving signal is different from the second display driving signal. In this way, the control circuit can optimize the timing of the touch operation, thereby improving the accuracy of the touch operation. According to some embodiments, the voltage value of the second display driving signal is the default voltage value. The default voltage value is the voltage value corresponding to the lowest brightness value or the lowest grayscale value of the light emitting unit. Therefore, when switching from the touch period to enter the display period, the light emitting unit in the display module does not need to be restarted and does not need to experience the restart time. In this way, the power consumption of the light emitting unit can be reduced.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An electronic device, comprising:
a touch module;
a display module, comprising a plurality of light emitting units; and
a control circuit, coupled to the touch module and the display module and configured to receive image data,
wherein during a display period, the control circuit provides a first display driving signal to the display module according to the image data,
wherein during a touch period, the control circuit provides a touch driving signal to the touch module according to the image data, and the control circuit provides a second display driving signal to the display module according to the image data,
wherein the touch period and the display period do not overlap, and the first display driving signal is different from the second display driving signal,
wherein the display module comprises a display panel, the display panel comprises the light emitting units,
wherein a voltage value of the second display driving signal comprises a default voltage value, and the default voltage value is greater than a reference low voltage value,
wherein the light emitting units provide a highest grayscale value according to the first display driving signal with a high voltage value, and
wherein the default voltage value is 30% to 50% of the high voltage value.

2. The electronic device according to claim 1, wherein a voltage value of the first display driving signal is greater than a voltage value of the second display driving signal.

3. The electronic device according to claim 2, wherein the default voltage value is a voltage value corresponding to a lowest brightness value of the light emitting units.

4. The electronic device according to claim 2, wherein the default voltage value is a voltage value corresponding to a lowest grayscale value of the light emitting units.

5. The electronic device according to claim 1, wherein when the second display driving signal is initially provided, the control circuit provides the touch driving signal after a delay time length.

6. The electronic device according to claim 1, wherein when the first display driving signal is dropped to the default voltage value, the control circuit provides the touch driving signal after a delay time length.

7. The electronic device according to claim 1, wherein when the first display driving signal is changed to the second display driving signal, the control circuit provides the touch driving signal after a delay time length.

8. An electronic device, comprising:
a touch module;
a display module, comprising a plurality of light emitting units; and
a control circuit, coupled to the touch module and the display module and configured to receive image data,
wherein during a display period, the control circuit provides a first display driving signal to the display module according to the image data,
wherein during a touch period, the control circuit provides a touch driving signal to the touch module according to the image data, and the control circuit provides a second display driving signal to the display module according to the image data,
wherein the touch period and the display period do not overlap, and the first display driving signal is different from the second display driving signal,
wherein the display period and the touch period are separated by a delay time length,
wherein the control circuit comprises:
a timing controller, configured to generate a digital data signal according to the image data and provide a synchronization signal; and
a voltage programming controller, configured to determine a default voltage value according to the digital data signal,
wherein a voltage value of the second display driving signal comprises the default voltage value, and the default voltage value is greater than a reference low voltage value.

9. The electronic device according to claim 8, wherein the voltage programming controller determines the default voltage value according to a minimum digital value of the digital data signal and a gamma curve.

10. The electronic device according to claim 8, wherein the timing controller adjusts a digital value of a digital data signal corresponding to the second display driving signal according to the default voltage value.

11. The electronic device according to claim 10, wherein the control circuit further comprises:
a display driving circuit, coupled to the timing controller and configured to generate one of the first display driving signal and the second display driving signal according to the digital data signal.

12. The electronic device according to claim 8, wherein the control circuit further comprises:
a touch driving circuit, coupled to the timing controller and configured to provide the touch driving signal to the touch module and receive a touch sensing signal from the touch module during the touch period.

13. The electronic device according to claim 12, wherein the timing controller provides the synchronization signal to the touch driving circuit and the display driving circuit.

* * * * *